Oct. 31, 1967 L. R. PAYTON Re. 26,293
METHOD OF MAKING A LOW PRESSURE, HERMETICALLY SEALED, SHEET METAL CONTAINER
Original Filed Feb. 27, 1962 2 Sheets-Sheet 1
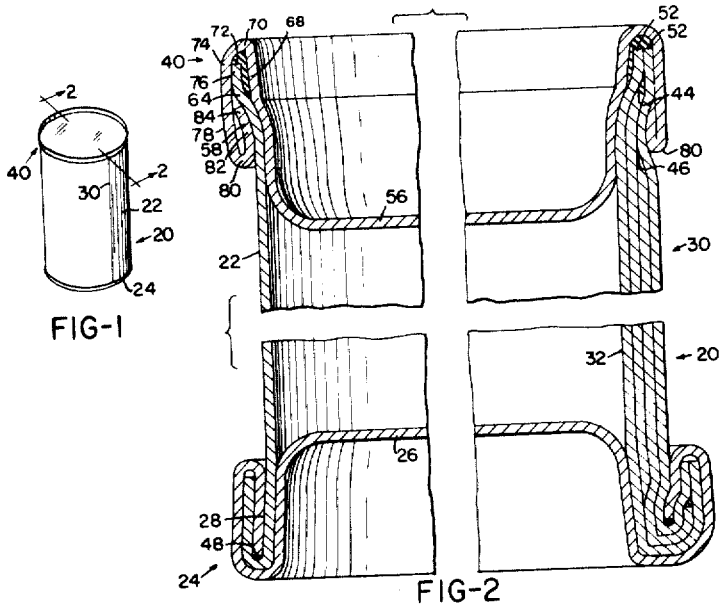
FIG-1
FIG-2
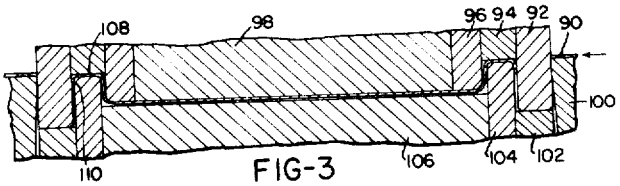
FIG-3
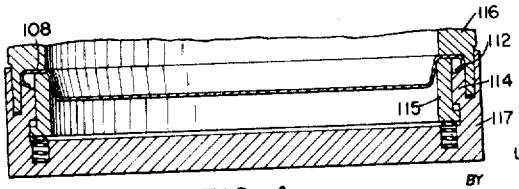
FIG-4
INVENTOR
LELAND R. PAYTON
BY
HIS ATTORNEYS Oct. 31, 1967 L. R. PAYTON Re. 26,293

METHOD OF MAKING A LOW PRESSURE, HERMETICALLY SEALED, SHEET METAL CONTAINER

Original Filed Feb. 27, 1962 2 Sheets-Sheet 2

INVENTOR
LELAND R. PAYTON
BY
Glenn, Palmer & Mathews
HIS ATTORNEYS

United States Patent Office

Re. 26,293
Reissued Oct. 31, 1967

26,293

METHOD OF MAKING A LOW PRESSURE, HERMETICALLY SEALED, SHEET METAL CONTAINER

Leland R. Payton, Richmond, Va., assignor to Reynolds Metals Company, Richmond, Va., a corporation of Delaware Original No. 3,223,063, dated Dec. 14, 1965, Ser. No. 175,999, Feb. 27, 1962. Application for reissue Aug. 5, 1966, Ser. No. 574,270
8 Claims. (Cl. 113—121)

Matter enclosed in heavy brackets [ ] appears in the original patent but forms no part of this reissue specification; matter printed in italics indicates the additions made by reissue.

This invention is directed to a low pressure, hermetically sealed, sheet metal container for containing low pressure fluids, frozen juices, such as orange juices, and the like.

According to one of the features of this invention, the container is economically manufactured and yet is hermetically sealed to the low pressure fluids or frozen juices and the like.

According to another feature of this invention, one of the covers of the container may be pried off by a hooked domestic bottle opener and the like, and it is not necessary to use the cutting type of can opener for removing the contents of the container.

According to another feature of this invention, the container may be manufactured from relatively thin aluminous metal sheet in an economical manner.

Accordingly, it is one of the objects of this invention to provide a container having one or more of the features herein disclosed.

Another object of this invention is to provide a method of manufacturing a container and having one or more of the features herein disclosed.

Other objects of this invention become apparent from this description and from the accompanying drawings in which:

FIGURE 1 is a view in perspective of a container embodying this invention.

FIGURE 2 is a vertical cross section taken along the line 2—2 of FIGURE 1, in enlarged scale.

FIGURE 3 is a diagrammatic cross section of an apparatus for producing the initial form of the end closure.

FIGURE 4 is a view somewhat similar to FIGURE 3, and showing an apparatus for producing a subsequent form of the end closure.

FIGURE 5 is a transverse cross-sectional view of the blank of FIGURE 5, with the end edges bent preliminarily to the formation of the longitudinal seam of the body of the container.

Figure 5:
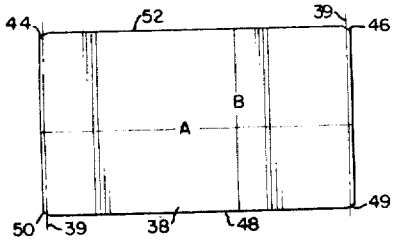
FIGURE 5 is a plan view of a blank for producing the body portion of the container.
Figure 6:
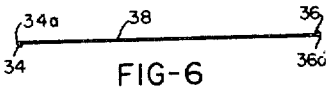

Certain words indicating direction or relative position, such as "vertical," "horizontal," "upper," "lower," etc. are used as applied to many of the views of the drawings, for clarity and brevity of description. However, it is to be understood that the various parts so described need not be in the particular position, direction, etc. in actual use.

A low pressure, hermetically sealed, sheet metal container 20 of this invention may include a central, vertical, cylindrical body portion 22. The word "vertical," as well as similar words, is used for the purpose of clarity and brevity, and is applied to the illustrations in the drawing, as previously indicated.

The central, vertical, cylindrical body portion 22 may be sealed at its lower end 24 by any suitable end closure 26 and by the use of any well known seam construction 28.

The cylindrical body 22 may be formed, previously to the closing of its ends, by any suitable well known cylinder forming operation and apparatus to produce the longitudinal seam 30. Preferably, the body of the seam 32 may be inside of the container and may be formed by the reversed ends 34 and 36 formed along the longitudinal edges of the blank 38, with the fold substantially along the lines 39 of FIGURE 5.

The upper end 40 of the container may be provided with a pry-off construction which includes features of this invention.

The blank 38, FIGURE 5, may be of suitable dimensions and may be in the form of a substantially rectangular blank. For a six-ounce container for frozen orange juice and the like, the blank may be 4.000 inches in dimension B and 6.778 inches in dimension A. The pry-off edge 52 may have a 20° corner cut at 44 and a 30° corner cut at 46. The longer cut of the corners 44 and 46, parallel to dimension A, may be .187 inch in length. The lower edge 48 may also have cut corners, the right-hand corner 49 being a 30° cut substantially identical and symmetrical to cut 46 while the left-hand corner 50 may be slightly curved with a distance parallel to dimension A of 7/32 inch and a distance of .098 inch parallel to dimension B with a radius of .480 inch. However, the dimensions and shapes of cuts are given by way of example, and may be varied somewhat, as desired. The cuts preferably are not of sufficient depth along the width B to produce leakage at the seam intersection with the end covers. The inside diameter of the body of the container may be 2.062 inches. The above dimensions are suitable for a six-ounce container.

Figure 10:
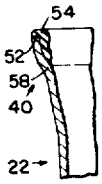
FIGURE 10 is a cross section of an end portion of the container body.

The upper, pry-off end body portion 40 is initially upwardly and outwardly flared at the upper body end with said upper body end 40 extending continuously upward and outward at 58, so that it terminates in an upper single thickness body end edge 52 as indicated in FIGURE 10, prior to the application of the pry-off cover or cup to be described. The flaring operation to produce the flare shown in FIGURE 10 may be performed by any suitable and well known apparatus. If desired, a sealing compound 54 may be applied to the upper end portion 40 of the uncovered cylindrical body 22. However, under certain conditions, the sealing compound 54 may be applied alternately or additionally to the cover after its edges have been preliminarily curled before application to the end of the body portion.

Figure 9:
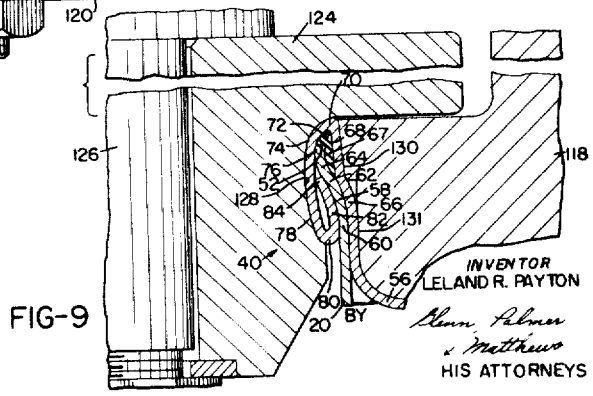
FIGURE 9 is a view of another apparatus for producing the final curl and sealing operation of the pry-off cover on the end of the body of the container.

An upper, pry-off covering cup 56 may be secured to the pry-off end body portion 40 so it has a final form as shown in FIGURES 2 and 9. In the final form, the pry-off end body portion 40 terminates in the upper body end edge 52 and has an upwardly increasingly flared body portion 58 extending approximately from the point 60 to the point 62. It is to be seen that the flare of portion 58 gradually increases due to the curvature imparted to the flare of the body portion from the point 60 to the point 62. The body portion 58 is joined by the upwardly uniformly flared merging body portion at point 62 to an upwardly decreasingly flared body portion 64 which terminates at the upper body end edge 52. It is to be seen that the portion 64 is upwardly decreasingly flared because of the curvature of the flare from the point 62 to the point 52.

The upper, pry-off covering cup 56 sealingly engages the pry-off upper end body portion 40. It has an upwardly increasingly flaring inner cup portion 66 tightly and contiguously engaging the inside of the increasingly flaring body portion 58. The cup also has an upward substantially uniformly increasing flaring inner cup portion 68 adjacent to but spaced from the decreasingly flaring body portion 64 to form a side part 67 of a sealing compound space. The lower end of space 67 is sealed by the contiguous portions 58 and 66.

The cup 56 has a reverse turn at 70 spaced above and turning above the upper body end edge 52 to form an upper part 72 of a sealing compound space above said upper body end edge 52.

The turn 70 of the cup merges with an outer cup part 74 having a downward, outwardly and gradually flaring outer cup portion which engages the extreme upper end 76 of the body adjacent to the upper body end edge 52, to seal the upper sealing compound space 72.

The outer cup portion 74 merges with a gradually inwardly contracting outer cup portion 78 which has an inward reverse fold 80 with an increasingly flaring fold portion 82 which tightly engages the outer surface of said increasingly flaring body portion 58.

The end 84 of the reverse fold 82 smoothly and slidingly engages the uniformly flared merging body portion 62, so that the fold portion may be easily upwardly pried off with a hook type bottle opener and the like.

Any well known sealing compound may be used substantially to fill the said sealing compound space 66, 72, heretofore described.

It is to be seen that the sealing compound produces an effective hermetic seal which is tightly enclosed by the rolling and curling operations to be described.

The cups 56 may be cut from strip material 90 by a combined blanking and drawing circular die member 92 which cooperates with the initial drawing members 94, 96, 98, 100, 102, 104, and 106 to blank and draw the cup into the initial form shown in FIGURE 3. In this form, the cup has been cut to produce an outward flange 108 and a downward flange 110. Member 98 may be a stenciling die to imprint a name or the like on the cup. The other members are well known blanking and drawing members to cut and draw a cup of the shape shown in FIGURE 3 from strip material 90, with the strip 90 being advanced leftwardly at suitable intervals, automatically to produce large quantities of cups, as is well known.

The cup produced by the apparatus of FIGURE 3 may then be subjected to a second operation shown in FIGURE 4 in which the downward flange 110 of FIGURE 3 is given an inward curl at 112 by the curling die 114 cooperating with the punch member 116 in a well known manner. Other members of the curling apparatus may include a resiliently supported ring 115, and the stationary base 117.

Figure 8:
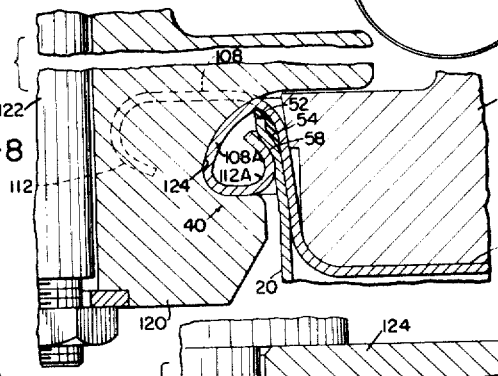
FIGURE 8 is a diagrammatic cross section of a portion of the apparatus for the initial curling of the pry-off cover around the end of the container body.

FIGURE 8 shows a curling operation and curling machinery in which the end body portion 40 which had been flared as shown in FIGURE 10, is placed in the curling apparatus of FIGURE 8 along with the cup 56. The cup 56 is initially in the stage shown in FIGURE 4, and this stage is shown with the flange 108 and curl 112 in dotted lines in FIGURE 9. The seaming chuck 118 receives the cup 56. The cylindrical body portion 20 is held by a lower end thrust member, not shown, which acts on the lower end 24 and pushes the initially flared end 40 with the sealing compound bead 54 adjacent the upper part of the vertical or inner cup part of the cup 56. An initial curling roll 120 is initially held by the shaft 122 sufficiently spaced from the chuck 118, to receive the curved flange 112 within the groove 124 while the shaft 122 is in a leftward position, not shown. The chuck 118 and the roll 120 are then relatively moved toward each other either by the movement of the roll 120 or the chuck 118, or both. An initial curling operation then proceeds so that the flange 108 and curl 112 are further curled to the positions 108A and 112A.

Thereupon the roll 120 is withdrawn. A seaming and sealing roll 124 and shaft 126 are moved relatively toward chuck 118, as shown in FIGURE 9, to form the seamed and sealed construction shown in FIGURE 9 and at the upper part of FIGURE 2. The roll 124 is so shaped that the groove 128 pushes the cup portions to the final form shown in FIGURE 9, and which has been previously described. The outwardly and uniformly flaring surface 130 and surface 131 of the chuck 118 cooperate with the groove 128 of the roll 124 to compact and seal the parts together with the sealing compound sealed in the space 67, 72 and with the end portion 76 maintaining and sealing the sealing compound by its tight fit with the portion 74. At the same time the inner part 66 of the cup seals the compound by its proximity to the part 58 of the body portion 20. The smooth fit produced by the end portion 84 of the reverse fold 82 permits the end portion 84 to slide upwardly, when pried upwardly by a hook type bottle opener, or the like.

The right-hand side of FIGURE 2 shows the seam construction at the top of the container where it intersects the vertical seam 30. The top edge of the cut 44 of FIGURE 5 is shown at 44 in FIGURE 2. The top edge of cut 46 of FIGURE 5 is shown at 46 in FIGURE 2. The top edge 52 of FIGURE 5 is shown at 52, 52 in FIGURE 2. The cross section at the upper right hand corner of FIGURE 2 is taken in zigzag manner to illustrate the upper surfaces of the cuts 44 and 46 and the upper edges 52, 52. It is to be noted that the top edges of the cuts 44, 46 do not extend any substantial distance below the reverse fold 80, so that a hermetic seal is produced and maintained by the seaming operation of FIGURE 9 so the sealing compound is maintained in sealed condition along the tops of the edges 44, 46, and 52.

The sealing compound is concentrated at the inner and top corner of the seam so that it produces a hermetic seal.

Preferably, the body 20 of the container may be made of aluminum alloy No. 5052–H36. The cups 26 and 56 may be made of aluminum alloy No. 5154–H38.

The container material, both inside and outside, may be coated with any suitable and well known material. For example, the surfaces which form the inside of the container may be coated with suitable lacquer which may be chemically resistant to the expected contents of the container.

The container is of a character to withstand, for example, ten pounds p.s.i. maximum pressure, and can be opened by a hook type can opener or bottle opener without making any sharp cuts and the like.

The approximately ⅛ inch flare at the top of the container has no reverse body parts and hence saves a substantial amount of metal at this point. The end closures 26 and 56 are made of heavier metal better to withstand outward pressure, and also because it is easier to form the end members 26 and 56 that it is to form the body member 30 so a harder alloy may be used for the end members. The vertical seam of the body requires a slightly softer alloy, and the body withstands the pressure in spite of the softer alloy because of its cylindrical shape.

While a six-ounce orange juice container has been specifically described, the invention is applicable to various sizes and shapes, such as twelve-ounce cans and the like.

Figure 7:
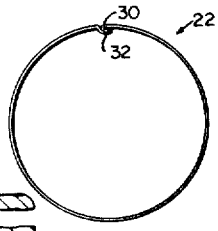
FIGURE 7 is a top view of the body of the container before the end closure is applied thereto.

In practicing the method of this invention, the rectangular sheet metal blank 38, FIGURE 5, is cut with the oblique slanting corner cuts 44, 46, 49 and 50 by any well known blanking process and apparatus. Opposed side seam folds 34 and 36 are then made by well known process and apparatus with the bends **34*a* and 36*a* being made substantially along lines 39 of FIGURE 5 and intersecting the corner cuts 44, 46, 49 and 50. The blank 38 is then formed into a vertical cylindrical body 22, the end of which is shown in FIGURE 7, and with a vertical seam 30 of FIGURE 1. The seam 30 is substantially coextentive with the cuts 44, 46, 49 and 50 when these cuts are folded along lines 39 of FIGURE 5 and are locked together which form seam 30. The upper body end 40 is outwardly flared, as shown in FIGURE 10. Sealing compound 54 is introduced between the upper body portion 40 and the sheet metal cup 56, for example, by applying the compound 54 to the inner upper edge of the body end 40, FIGURE 10. The cup 56 is formed with an inner cup portion which has upwardly flaring inner cup portion or part 66 tightly engaging the inside part of upwardly increasingly flaring body portion 58. Another part 68 of the inner cup portion is spaced from the part 64 of the upwardly flared body portion to form the side part 67 of the sealing compound space in which the sealing compound is sealed at the bottom by contiguous parts 58 and 66**.

The cup 56 is formed by the processes and apparatus of FIGURES 3, 4, 8 and 9 with a reverse turn 70 spaced above and turning above the upper body end edge 52 to form the upper part 72 of the sealing compound space above the upper body end edge 52. The reverse turn 70 is then formed and merges with a downward outwardly flaring outer cup portion 74 which engages the extreme body upper end 76 of the body 22 adjacent the upper end edge 52. This seals the sealing compound at this upper zone. The outer cup part 74 then is caused to merge with the inwardly contracting part 78, by the action of roller groove 128, FIGURE 9, and then is formed into an upward reverse fold 80 and with an outwardly flaring fold 82 to engage the outer surface of the outwardly flaring body portion 58 with the end 84 of the reverse fold smoothly and slidingly engaging the outer surface of the outwardly flaring body portion 58.

The combined operation of the apparatus of FIGURES 3, 4, 8 and 9 is such that the sealing compound is effectively sealed at 74, 76 and 58, 66 to produce a hermetic seal for the container. At the same time a smooth and sliding engagement is produced between the end portion 84 and the flaring portion 64 so the cup 56 may be pried off by a hook engagement with the reverse fold 80.

All of these features and advantages are produced by simple parts, method procedures, and apparatus. When aluminous sheet metal is used, the prying action of a hook type can or bottle opener easily lifts the closure member. An improved container and method of making the same has therefore been provided.

While the form of the invention now preferred has been disclosed as required by the statutes, other forms may be used, all coming within the scope of the claims which follow:

What is claimed is:

1. A method in the manufacture of a low pressure, hermetically sealed, sheet container which comprises: forming from a rectangular sheet blank a vertical cylindrical body with upper and lower body ends; forming a sheet upper cup with an inner cup portion joined at its upper cup edge to an outward flange having an inward curl at the outer edge of said flange; initially upwardly and outwardly flaring said upper body end with said upper body end extending continuously upward and outward and terminating in an upper single thickness body end edge; introducing sealing compound around the inner surface of said upper body end and on said upper body end edge; initially inserting said upper cup into said upwardly and outwardly flared upper body end and inside said sealing compound; curling said outward flange and inward curl against the outer surface of said upper body end; performing a seam rolling step on said initially curled flange and curl and said upper body end to cause said upper end body to have an upwardly increasingly flared body portion joined by an upwardly uniformly flared merging body portion to an upwardly decreasingly flared body portion which terminates at said upper body end edge, said seam rolling step also causing said upper cup sealingly to engage said upper end body portion and to have an upwardly increasingly flaring inner cup portion tightly engaging the inside of said increasingly flaring body portion, said seam rolling step also causing said inner cup portion to have an upward substantially uniformly increasing flaring inner cup portion adjacent to but spaced from said decreasingly flaring body portion to form a side part of a sealing compound space in which said sealing compound is sealed at the bottom, said seam rolling step also causing said cup to form a reverse turn spaced above and turning above said upper body end edge to form an upper part of said sealing compound space above said upper body edge, said seam rolling step also causing said turn to merge with an outer cup part having a downward outwardly gradually flaring outer cup portion engaging the extreme upper end of said body adjacent said upper body end edge to seal the upper portion of said sealing compound, and causing said outer cup portion to merge with a gradually inwardly contracting outer cup portion, said seam rolling step also causing said last-named portion to be reversely folded with an increasingly flaring fold portion tightly engaging the outer surface of said increasingly flaring body portion.

2. A method in the manufacture of a low pressure, hermetically sealed, sheet container which comprises: forming from a rectangular sheet blank, a central, vertical, cylindrical body portion with an upper body end extending continuously upward and outward and terminating in an upper single thickness body end edge; forming a sheet cup with an upwardly flaring inner cup portion and with an upper outward flange portion; introducing a sealing compound and said inner cup portion into said upper body and with said compound between said upper body end and said inner cup portion; forming said cup with an upwardly flaring inner cup portion with a cup part tightly engaging an inside body part of said body end; forming said inner cup portion with another cup part spaced from another body part of said upper body end to form a side part of a sealing compound space in which said sealing compound is sealed at the bottom of said space; forming said cup with a reverse turn spaced above and turning above said upper body end edge to form an upper part of said sealing compound space above said upper body end edge; forming and merging said reverse turn with a downward outer cup portion which engages the outer surface of the extreme upper end of said body adjacent said upper body end edge; forming an upward reverse cup fold with an outwardly flaring cup fold engaging the outer surface of said outwardly flared body portion with the end of said reverse cup fold smoothly and slidingly engaging the outer surface of said outwardly flared body portion.

3. A method according to claim 2 in which said sheet blank is made of an aluminous metal.

4. A method in the manufacture of a low pressure, hermetically sealed, sheet container which comprises: forming a rectangular sheet blank with oblique slanting corner cuts along one edge; forming opposed side seam folds on said blank with the bends of the folds intersecting said cuts; forming said blank into a vertical cylindrical body with an upper body end and with a vertical seam produced by interlocking said folds with said seam being substantially coextensive with said cuts; upwardly and outwardly flaring said upper body end with said end extending continuously upward and outward and terminating in an upper single thickness body end edge; forming a sheet upper cup with an inner cup portion joined at its upper cup edge to an outward flange having an inward curl at the outer edge of said flange; introducing a sealing compound and said inner cup portion into said upper body end with said compound between said upper body end and said inner cup portion; forming said cup with an upwardly flaring inner cup portion with a part tightly engaging the inside of part of said outwardly flared body end; forming said inner cup portion with another cup part spaced from another body part of said upper outwardly flared body end to form a side part of a sealing compound space in which said sealing compound is sealed at the bottom of said space; forming said cup with a reverse turn spaced above and turning above said upper body end edge to form an upper part of said sealing compound space above said upper body end edge; forming and merging said reverse turn with a downward outer cup portion which engages the outer surface of the extreme upper end of said body adjacent said upper body end edge; forming an upward reverse cup fold with an outwardly flaring cup fold engaging the outer surface of said outwardly flared body portion with the end of said reverse cup fold smoothly and slidingly engaging the outer surface of said outwardly flared body portion.

5. A method according to claim 4 in which said sheet blank is made of an aluminous metal.

*6. A method in the manufacture of a low pressure, hermetically sealed container which comprises: forming a vertical cylindrical body with an upper body end; forming a cup with an inner cup portion joined at its upper cup edge to an outward flange having an inward curl at the outer edge of said flange; initially upwardly and outwardly flaring said upper body end with said upper body end extending continuously upward and outward and terminating in an upper single thickness body end edge; introducing sealing compound around the inner surface of said upper body end and on said upper body end edge; initially inserting said cup into said upwardly and outwardly flared upper body end and inside said sealing compound; curling said outward flange and inward curl against the outer surface of said upper body end; performing a seam rolling step on said initially curled flange and curl and said upper body end to cause said upper end body to have an upwardly increasingly flared body portion joined by an upwardly uniformly flared merging body portion to an upwardly decreasingly flared body portion which terminates at said upper body end edge, said seam rolling step also causing said cup sealingly to engage said upper end body portion and to have an upwardly increasingly flaring inner cup portion tightly engaging the inside of said increasingly flaring body portion, said seam rolling step also causing said inner cup portion to have an upward substantially uniformly increasing flaring inner cup portion adjacent to but spaced from said decreasingly flaring body portion to form a side part of a sealing compound space in which said sealing compound is sealed at the bottom, said seam rolling step also causing said cup to form a reverse turn spaced above and turning above said upper body end edge to form an upper part of said sealing compound space above said upper body edge, said seam rolling step also causing said turn to merge with an outer cup part having a downward outwardly gradually flaring outer cup portion engaging the extreme upper end of said body adjacent said upper body end edge to seal the upper portion of said sealing compound, and causing said outer cup portion to*

*merge with a gradually inwardly contracting outer cup portion, said seam rolling step also causing said last-named portion to be reversely folded with an increasingly flaring fold portion tightly engaging the outer surface of said increasingly flaring body portion.*

*7. A method in the manufacture of a low pressure, hermetically sealed container which comprises: forming a central, vertical, cylindrical body portion with an upper body end extending continuously upward and outward and terminating in an upper single thickness body end edge; forming a cup with an upwardly flaring inner cup portion and with an upper outward flange portion; introducing a sealing compound and said inner cup portion into said upper body and with said compound between said upper body end and said inner cup portion; forming said cup with an upwardly flaring inner cup portion with a cup part tightly engaging an inside body part of said body end; forming said inner cup portion with another cup part spaced from another body part of said upper body end to form a side part of a sealing compound space in which said sealing compound is sealed at the bottom of said space; forming said cup with a reverse turn spaced above and turning above said upper body end edge to form an upper part of said sealing compound space above said upper body end edge; forming and merging said reverse turn with a downward outer cup portion which engages the outer surface of the extreme upper end of said body adjacent said upper body end edge; forming an upward reverse cup fold with an outwardly flaring cup fold engaging the outer surface of said outwardly flared body portion with the end of said reverse cup fold smoothly and slidingly engaging the outer surface of said outwardly flared body portion.*

*8. A method according to claim 7 in which said cylindrical body portion is made of an aluminous metal.*

References Cited

The following references, cited by the Examiner, are of record in the patented file of this patent or the original patent.

UNITED STATES PATENTS

| | | | |
|---|---|---|---|
| 234,269 | 11/1880 | Green | 113—120 |
| 874,346 | 12/1907 | Krummel | 113—121 |
| 2,028,798 | 1/1939 | Murch | 113—120 |
| 2,178,618 | 11/1939 | Taylor | 113—120 |
| 2,337,452 | 12/1943 | Compo | 113—121 |
| 2,346,619 | 4/1944 | Schrader | 113—120 |
| 2,382,378 | 8/1945 | Bloedorn | 113—120 |
| 2,384,042 | 9/1945 | O'Brien | 220—67 |
| 2,428,371 | 10/1947 | Kinberg | 220—67 |
| 3,073,478 | 1/1963 | Henchert | 113—120 |

FOREIGN PATENTS

| | | |
|---|---|---|
| 656,022 | 1/1963 | Canada. |

CHARLES W. LANHAM, *Primary Examiner.*

H. D. HOINKES, *Assistant Examiner.*